US009935922B2

(12) United States Patent
Nas et al.

(10) Patent No.: US 9,935,922 B2
(45) Date of Patent: Apr. 3, 2018

(54) METHODS, SYSTEMS, AND COMPUTER READABLE MEDIA FOR SCREENING DIAMETER MESSAGES WITHIN A DIAMETER SIGNALING ROUTER (DSR) HAVING A DISTRIBUTED MESSAGE PROCESSOR ARCHITECTURE

(75) Inventors: Petrus Wilhelmus Adrianus Jacobus Maria Nas, The Hague (NL); Thomas Matthew McCann, Raleigh, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 1130 days.

(21) Appl. No.: 13/354,149

(22) Filed: Jan. 19, 2012

(65) Prior Publication Data
US 2012/0191847 A1 Jul. 26, 2012

Related U.S. Application Data

(60) Provisional application No. 61/435,102, filed on Jan. 21, 2011.

(51) Int. Cl.
*G06F 15/173* (2006.01)
*H04L 29/06* (2006.01)
(Continued)

(52) U.S. Cl.
CPC ...... *H04L 63/0227* (2013.01); *H04L 63/0263* (2013.01); *H04L 41/06* (2013.01);
(Continued)

(58) Field of Classification Search
CPC . H04L 63/0892; H04L 45/028; H04L 45/304; H04L 63/0227
(Continued)

(56) References Cited

U.S. PATENT DOCUMENTS

| 4,310,727 A | 1/1982 | Lawser |
| 4,754,479 A | 6/1988 | Bicknell et al. |

(Continued)

FOREIGN PATENT DOCUMENTS

| CA | 2 716 544 A1 | 12/2010 |
| CN | 1964316 A | 5/2007 |

(Continued)

OTHER PUBLICATIONS

Congdon, P., Sanchez, M., and B. Aboba, "RADIUS Filter Rule Attribute", RFC 4849, DOI 10.17487/RFC4849, Apr. 2007, <https://www.rfc-editor.org/info/rfc4849>.*

(Continued)

*Primary Examiner* — Taylor Elfervig
(74) *Attorney, Agent, or Firm* — Jenkins, Wilson, Taylor & Hunt, P.A.

(57) ABSTRACT

According to one aspect, the subject matter described herein includes a method for screening Diameter messages within a Diameter signaling router (DSR) having a distributed message processor architecture. The method includes steps occurring at a DSR comprising a plurality of Diameter message processors, each configured to perform at least one Diameter function. The steps include receiving, at an ingress Diameter message processor of the Diameter message processors, a Diameter message from a Diameter peer node. The steps also include identifying, at a Diameter application message processor of the Diameter message processors, a Diameter message screening rule associated with the received Diameter message. The steps further include performing, at the Diameter application message processor of the Diameter message processors, a screening function associated with the identified Diameter message screening rule on the received Diameter message.

23 Claims, 11 Drawing Sheets

(51) Int. Cl.
*H04L 12/24* (2006.01)
*H04L 12/58* (2006.01)
(52) U.S. Cl.
CPC .......... *H04L 51/12* (2013.01); *H04L 63/0892* (2013.01); *H04L 63/101* (2013.01)
(58) Field of Classification Search
USPC ........................................................ 709/224
See application file for complete search history.

(56) References Cited

U.S. PATENT DOCUMENTS

| | | |
|---|---|---|
| 5,089,954 A | 2/1992 | Rago |
| 5,237,604 A | 8/1993 | Ryan |
| 5,247,571 A | 9/1993 | Kay et al. |
| 5,251,248 A | 10/1993 | Tokunaga et al. |
| 5,400,390 A | 3/1995 | Salin |
| 5,422,941 A | 6/1995 | Hasenauer et al. |
| 5,423,068 A | 6/1995 | Hecker |
| 5,430,719 A | 7/1995 | Weisser, Jr. |
| 5,442,683 A | 8/1995 | Hoogeveen |
| 5,455,855 A | 10/1995 | Hokari |
| 5,457,736 A | 10/1995 | Cain et al. |
| 5,481,603 A | 1/1996 | Gutierrez et al. |
| 5,502,726 A | 3/1996 | Fischer |
| 5,504,804 A | 4/1996 | Widmark et al. |
| 5,526,400 A | 6/1996 | Nguyen |
| 5,579,372 A | 11/1996 | Åström |
| 5,590,398 A | 12/1996 | Matthews |
| 5,594,942 A | 1/1997 | Antic et al. |
| 5,623,532 A | 4/1997 | Houde et al. |
| 5,689,548 A | 11/1997 | Maupin et al. |
| 5,706,286 A | 1/1998 | Reiman et al. |
| 5,711,002 A | 1/1998 | Foti |
| 5,819,178 A | 10/1998 | Cropper |
| 5,822,694 A | 10/1998 | Coombes et al. |
| 5,832,382 A | 11/1998 | Alperovich |
| 5,854,982 A | 12/1998 | Chambers et al. |
| 5,878,347 A | 3/1999 | Joensuu et al. |
| 5,878,348 A | 3/1999 | Foti |
| 5,890,063 A | 3/1999 | Mills |
| 5,953,662 A | 9/1999 | Lindquist et al. |
| 5,953,663 A | 9/1999 | Maupin et al. |
| 5,983,217 A | 11/1999 | Khosravi-Sichannie et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,097,960 A | 8/2000 | Rathnasabapathy et al. |
| 6,115,463 A | 9/2000 | Coulombe et al. |
| H1895 H | 10/2000 | Hoffpauir et al. |
| 6,128,377 A | 10/2000 | Sonnenberg |
| 6,137,806 A | 10/2000 | Martinez |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,192,242 B1 | 2/2001 | Rollender |
| 6,205,210 B1 | 3/2001 | Rainey et al. |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,308,075 B1 | 10/2001 | Irten et al. |
| 6,327,350 B1 | 12/2001 | Spangler et al. |
| 6,377,674 B1 | 4/2002 | Chong et al. |
| 6,411,632 B2 | 6/2002 | Lindgren et al. |
| 6,424,832 B1 | 7/2002 | Britt et al. |
| 6,463,055 B1 | 10/2002 | Lupien et al. |
| 6,505,046 B1 | 1/2003 | Baker |
| 6,515,997 B1 | 2/2003 | Feltner et al. |
| 6,535,746 B1 | 3/2003 | Yu et al. |
| 6,539,077 B1 | 3/2003 | Ranalli et al. |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,577,723 B1 | 6/2003 | Mooney |
| 6,594,258 B1 | 7/2003 | Larson et al. |
| 6,611,516 B1 | 8/2003 | Pirkola et al. |
| 6,643,511 B1 | 11/2003 | Rune et al. |
| 6,683,881 B1 | 1/2004 | Mijares et al. |
| 6,684,073 B1 | 1/2004 | Joss et al. |
| 6,731,926 B1 | 5/2004 | Link, II et al. |
| 6,738,636 B2 | 5/2004 | Lielbriedis |
| 6,748,057 B2 | 6/2004 | Ranalli et al. |
| 6,775,737 B1 | 8/2004 | Warkhede et al. |
| 6,795,546 B2 | 9/2004 | Delaney et al. |
| 6,795,701 B1 | 9/2004 | Baker et al. |
| 6,839,421 B2 | 1/2005 | Ferraro Esparza et al. |
| 6,871,070 B2 | 3/2005 | Ejzak |
| 6,917,612 B2 | 7/2005 | Foti et al. |
| 6,950,441 B1 | 9/2005 | Kaczmarczyk et al. |
| 6,967,956 B1 | 11/2005 | Tinsley et al. |
| 7,010,002 B2 | 3/2006 | Chow et al. |
| 7,027,582 B2 | 4/2006 | Khello et al. |
| 7,043,000 B2 | 5/2006 | Delaney et al. |
| 7,079,524 B2 | 7/2006 | Bantukul et al. |
| 7,079,853 B2 | 7/2006 | Rathnasabapathy et al. |
| 7,170,982 B2 | 1/2007 | Li et al. |
| 7,221,952 B2 | 5/2007 | Cho et al. |
| 7,286,516 B2 | 10/2007 | Delaney et al. |
| 7,286,839 B2 | 10/2007 | McCann et al. |
| 7,298,725 B2 | 11/2007 | Rune |
| 7,383,298 B2 | 6/2008 | Palmer et al. |
| 7,403,537 B2 | 7/2008 | Allison et al. |
| 7,466,807 B2 | 12/2008 | McCann et al. |
| 7,633,872 B2 | 12/2009 | Pitcher et al. |
| 7,633,969 B2 | 12/2009 | Caugherty et al. |
| 7,706,343 B2 | 4/2010 | Delaney et al. |
| 7,916,685 B2 | 3/2011 | Schaedler et al. |
| 7,961,685 B2 | 6/2011 | Suh et al. |
| 7,996,007 B2 | 8/2011 | Bantukul |
| 7,996,541 B2 | 8/2011 | Marathe et al. |
| 8,045,983 B2 | 10/2011 | Bantukul |
| 8,050,391 B1 | 11/2011 | Andreasen et al. |
| 8,219,697 B2 | 7/2012 | Langen et al. |
| 8,468,267 B2 | 6/2013 | Yigang et al. |
| 8,504,630 B2 | 8/2013 | Craig et al. |
| 8,613,073 B2 | 12/2013 | McCann et al. |
| 8,750,126 B2 | 6/2014 | McCann et al. |
| 8,958,306 B2 | 2/2015 | McCann et al. |
| 9,647,986 B2 | 5/2017 | McCann et al. |
| 2001/0030957 A1 | 10/2001 | McCann et al. |
| 2001/0040957 A1 | 11/2001 | McCann et al. |
| 2001/0053694 A1 | 12/2001 | Igarashi et al. |
| 2002/0057669 A1 | 5/2002 | Joung |
| 2002/0147845 A1 | 10/2002 | Sanchez-Herrero et al. |
| 2002/0173320 A1 | 11/2002 | Aitken et al. |
| 2003/0007482 A1 | 1/2003 | Khello et al. |
| 2003/0026289 A1 | 2/2003 | Mukherjee et al. |
| 2003/0081754 A1 | 5/2003 | Esparza et al. |
| 2003/0109271 A1 | 6/2003 | Lewis et al. |
| 2003/0193967 A1 | 10/2003 | Fenton et al. |
| 2003/0227899 A1 | 12/2003 | McCann |
| 2004/0003114 A1 | 1/2004 | Adamczyk |
| 2004/0034699 A1 | 2/2004 | Gotz et al. |
| 2004/0081206 A1 | 4/2004 | Allison et al. |
| 2004/0082332 A1 | 4/2004 | McCann et al. |
| 2004/0087300 A1 | 5/2004 | Lewis |
| 2004/0142707 A1 | 7/2004 | Midkiff et al. |
| 2004/0198351 A1 | 10/2004 | Knotts |
| 2004/0202187 A1 | 10/2004 | Kelly et al. |
| 2004/0246965 A1 | 12/2004 | Westman et al. |
| 2006/0067338 A1 | 3/2006 | Hua et al. |
| 2006/0123477 A1 | 6/2006 | Raghavan et al. |
| 2006/0136557 A1 | 6/2006 | Schaedler et al. |
| 2006/0225128 A1 | 10/2006 | Aittola et al. |
| 2007/0067794 A1 | 3/2007 | Russell et al. |
| 2008/0025230 A1 | 1/2008 | Patel et al. |
| 2008/0160954 A1 | 7/2008 | Agarwal et al. |
| 2008/0165687 A1 | 7/2008 | Wang |
| 2008/0167035 A1 | 7/2008 | Buckley et al. |

(56) References Cited

U.S. PATENT DOCUMENTS

| | | |
|---|---|---|
| 2009/0080410 A1 | 3/2009 | Aoyagi et al. |
| 2009/0185494 A1 | 7/2009 | Li et al. |
| 2009/0193071 A1 | 7/2009 | Qiu et al. |
| 2009/0264096 A1 | 10/2009 | Cai et al. |
| 2010/0042525 A1 | 2/2010 | Cai et al. |
| 2010/0177780 A1 | 7/2010 | Ophir et al. |
| 2010/0202383 A1 | 8/2010 | Sugimoto et al. |
| 2010/0217877 A1 | 8/2010 | Willars et al. |
| 2010/0299451 A1 | 11/2010 | Yigang et al. |
| 2010/0304710 A1 | 12/2010 | Sharma et al. |
| 2011/0014939 A1 | 1/2011 | Ravishankar et al. |
| 2011/0038287 A1 | 2/2011 | Agarwal et al. |
| 2011/0116382 A1* | 5/2011 | McCann et al. ............ 370/241 |
| 2011/0126277 A1 | 5/2011 | McCann et al. |
| 2011/0188397 A1 | 8/2011 | McCann et al. |
| 2011/0202613 A1 | 8/2011 | Craig et al. |
| 2011/0225281 A1 | 9/2011 | Riley et al. |
| 2011/0289162 A1* | 11/2011 | Furlong ............... H04L 12/585 709/206 |
| 2011/0295978 A1* | 12/2011 | Pazos et al. ................ 709/219 |
| 2011/0320622 A1 | 12/2011 | Cutler et al. |
| 2013/0039176 A1 | 2/2013 | Kanode et al. |
| 2013/0163424 A1 | 6/2013 | Goerke et al. |
| 2013/0163429 A1* | 6/2013 | Dunstan ................. H04L 47/12 370/235 |
| 2014/0181952 A1 | 6/2014 | McCann et al. |
| 2015/0282242 A1 | 10/2015 | Merino Vazquez et al. |
| 2016/0014635 A1 | 1/2016 | Rasanen |
| 2016/0073282 A1 | 3/2016 | Speicher et al. |
| 2017/0013502 A1 | 1/2017 | Baniel et al. |

FOREIGN PATENT DOCUMENTS

| | | |
|---|---|---|
| CN | ZL 201080056996.8 | 4/2015 |
| CN | 103460648 B | 4/2017 |
| EP | 0 512 962 A2 | 11/1992 |
| EP | 0 936 825 A3 | 8/1999 |
| EP | 0 944 276 A1 | 9/1999 |
| EP | 1 054 529 A2 | 11/2000 |
| EP | 1 314 324 B1 | 8/2008 |
| EP | 1 847 076 B1 | 2/2012 |
| EP | 2 819 455 A1 | 12/2014 |
| IL | 219214 | 10/2015 |
| KR | 10-2004-0107271 A | 12/2004 |
| WO | WO 1995/012292 A1 | 5/1995 |
| WO | WO 1996/011557 | 4/1996 |
| WO | WO 1997/033441 A1 | 9/1997 |
| WO | WO 1998/056195 | 12/1998 |
| WO | WO 1999/011087 A2 | 3/1999 |
| WO | WO 1999/057926 | 11/1999 |
| WO | WO 2000/016583 A1 | 3/2000 |
| WO | WO 2004/006534 A1 | 1/2004 |
| WO | WO 2004/075507 A2 | 9/2004 |
| WO | WO 2007/045991 A1 | 4/2007 |
| WO | WO 2008/087633 A2 | 7/2008 |
| WO | WO 2009/070179 A1 | 6/2009 |
| WO | WO 2011/047382 A2 | 4/2011 |
| WO | WO 2011/100621 A2 | 8/2011 |
| WO | WO 2014/185987 A1 | 11/2014 |

OTHER PUBLICATIONS

F. Eyermann, P. Racz, B. Stiller, C. Schaefer and T. Walter, "Diameter-based accounting management for wireless services," IEEE Wireless Communications and Networking Conference, 2006. WCNC 2006., Las Vegas, NV, 2006, pp.*

D. Tairov, I. Ganchev and M. O'Droma, "Signaling Messages and AVPs for 3P-AAA Framework," 2011 Fifth International Conference on Next Generation Mobile Applications, Services and Technologies, Cardiff, 2011, pp. 180-184.*

Ma Wenjing, Song Junde, Wu Jianqing and Song Mei, "A new type diameter-transmission mechanism based on distributed authorization signaling," 2009 Joint Conferences on Pervasive Computing (JCPC), Tamsui, Taipei, 2009, pp.*

P. J. Li and C. S. Zhi, "A Mobile IPv6 Firewall Traversal Scheme Integrating with AAA," 2006 International Conference on Wireless Communications, Networking and Mobile Computing, Wuhan, 2006, pp. 1-6.*

Non-Final Office Action for U.S. Appl. No. 12/906,998 (dated Jan. 2, 2013.

Notification of Transmittal of the International Search Report and the Written Opinion of the International Searching Authority, or the Declaration for International Application No. PCT/US2012/021874 (dated Sep. 21, 2012).

Final Official Action for U.S. Appl. No. 12/906,998 (dated Mar. 29, 2012).

Notification of Transmittal of the International Search Report and the Written Opinion of the International Searching Authority, or the Declaration for International Application No. PCT/US2011/024637 (dated Oct. 27, 2011).

Non-Final Official Action for U.S. Appl. No. 12/906,998 (dated Sep. 21, 2011).

Traffix Systems, "Datasheet; Traffix Signaling Delivery Controller (SDC)," pp. 1-5 (May 2011).

"Ericsson Unified Number Portability," (Downloaded from the Internet on Jan. 24, 2011).

Tsou et al., "Realm-Based Redirection in Diameter," draft-ietf-dime-realm-based-redirect-03, RFC 3588, pp. 1-6 (Jul. 12, 2010).

Znaty, "Diameter, GPRS, (LTE ° ePC=EPS), IMS, PCC and SDM," EFORT (May 2010). (Part 1 of 2, pp. 1-229).

Znaty, "Diameter, GPRS, (LTE + ePC=EPS), IMS, PCC and SDM," EFORT (May 2010). (Part 2 of 2, pp. 230-460).

"3rd Generation Partnership Project; Technical Specification Group Core Network and Terminals; Policy and Charging Control signalling flows and Quality of Service (QoS) parameter mapping (Release 9)," 3GPP TS 29.213, V9.2.0, pp. 1-129 (Mar. 2010).

"Mapping Diameter Interfaces to Functionality in 3GPP/3GPP2 IMS Architecture," Whitepaper by Traffix Systems, pp. 1-10 (Copyright 2010).

Korhonen et al., "Clarifications on the Routing of Diameter Requests Based on the Username and the Realm," RFC 5729, pp. 1-9 (Dec. 2009).

3GPP, "3rd Generation Partnership Project; Technical Specification Group Services and System Aspects; Generic Authentication Architecture (GAA); Generic Bootstrapping Architecture (Release 9)," 3GPP TS 33.220 V9.2.0 (Dec. 2009).

3GPP, "3rd Generation Partnership Project; Technical Specification Group Service and System Aspects; Telecommunication Management; Charging Management; Diameter Charging Applications (Release 9)," 3GPP TS 32.299 V9.2.0 (Dec. 2009).

3GPP, "3rd Generation Partnership Project; Technical Specification Group Service and System Aspects; Telecommunication Management; Charging Management; Online Charging System (OCS): Applications and Interfaces (Release 9)," 3GPP TS 32.296 V9.1.0 (Dec. 2009).

3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).

3GPP, "3rd Generation Partnership Project; Technical Specification Group Core Network and Terminals; Sh Interface Based on the Diameter Protocol; Protocol Details (Release 9)," 3GPP TS 29.329 V9.0.0 (Dec. 2009).

3GPP, "3rd Generation Partnership Project; Technical Specification Group Core Network and Terminals; IP Multimedia (IM) Subsystem Sh Interface; Signalling Flows and Message Contents (Release 9)," 3GPP TS 29.328 V9.0.0 (Dec. 2009).

3GPP, "3rd Generation Partnership Project; Technical Specification Group Core Network and Terminals; 3GPP System to Wireless Local Area Network (WLAN) Interworking; Stage 3 (Release 9)," 3GPP TS 29.234 V9.0.0 (Dec. 2009).

3GPP, "3rd Generation Partnership Project; Technical Specification Group Core Network and Terminals; Cx and Dx Interfaces Based on the Diameter Protocol; Protocol Details (Release 9)," 3GPP TS 29.229 V9.0.0 (Dec. 2009).

(56) References Cited

OTHER PUBLICATIONS

3GPP, "3rd Generation Partnership Project; Technical Specification Group Core Network and Terminals; IP Multimedia (IM) Subsystem Cx and Dx Interfaces; Signalling Flows and Message Contents (Release 9)," 3GPP TS 29.228 V9.0.0 (Dec. 2009).
3GPP, "3rd Generation Partnership Project; Technical Specification Group Core Network and Terminals; Policy and Charging Control Over Rx Reference Point (Release 9)," 3GPP TS 29.214 V9.2.0 (Dec. 2009).
3GPP, "3rd Generation Partnership Project; Technical Specification Group Core Network and Terminals; Policy and Charging Control over Gx Reference Point (Release 9)," 3GPP TS 29.212 V9.1.0 (Dec. 2009).
3GPP, "3rd Generation Partnership Project; Technical Specification Group Services and System Aspects; Policy and Charging Control Architecture (Release 9)," 3GPP TS 23.203 V9.3.0 (Dec. 2009).
Tsou et al., "Realm-Based Redirection in Diameter," Internet Engineering Task Force, draft-ietf-dime-realm-based-redirect-02, pp. 1-7 (Oct. 27, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 9)," 3GPP TS 29.272, V9.0.0, pp. 1-71 (Sep. 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.4.0, pp. 1-71 (Sep. 2009).
"3rd Generation Partnership Project; Technical Specification Group Services and System Aspects; Policy and charging control architecture (Release 8)," 3GPP TS 23.203, V8.1.1, pp. 1-87 (Mar. 2008).
"IP Multimedia Subsystem," printout from wikipedia.org, Wikimedia Foundation, Inc. (May 29, 2007).
"HP OpenCall Home Subscriber Server Software—Data Sheet", 4AA0-3360ENW Rev. 2, Hewlett-Packard Development Company, L.P. (Jul. 2006).
Tschofenig et al., "Securing the Next Steps in Signaling (NSIS) Protocol Suite," International Journal of Internet Protocol Technology, vol. 1, pp. 1-14 (2006).
Stiemerling et al., "NAT/Firewall NSIS Signaling Layer Protocol (NSLP)," draft-ietf-nsis-nslp-natfw-06, pp. 1-70 (May 16, 2005).
3GPP, "3rd Generation Partnership Project; Technical Specification Group Service and System Aspects; Telecommunication Management; Charging Management; Charging Data Description for the IP Multimedia Subsystem (IMS) (Release 5)," 3GPP TS 32.225 V5.11.0 (Mar. 2006).
3GPP, "3rd Generation Partnership Project; Technical Specification Group Core Network and Terminals; Policy Control Over Go Interface (Release 6)," 3GPP TS 29.207 V6.5.0 (Sep. 2005).
Hakala et al., "Diameter Credit-Control Application," Network Working Group RFC 4006, pp. 1-107 (Aug. 2005).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Walker, "The IP Revolution in Mobile Messaging," Packet, Cisco Systems Users Magazine, vol. 16, No. 1, pp. Cover, 73-74; and 89 (First Quarter 2004).
"Cisco ITP Multilayer Routing (MLR) SMS MO Routing Requirements," Cisco Systems, Inc., p. 1 (Copyright 2004).

"Cisco Signaling Gateway Manager Release 3.2 for Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Calhoun et al., "Diameter Base Protocol," RFC 3588, pp. 1-147 (Sep. 2003).
Moodie, "Agilent acceSS7: White Paper," Agilent Technologies, pp. 1-14 (Apr. 1, 2003).
"Cisco IP Transfer Point," Cisco Systems, Inc., pp. 1-10 (Copyright 1992-2003).
"Cisco IP Transfer Point Multilayer Short Message Service Routing Solution," Cisco Systems, Inc., pp. 1-6 (Copyright 1992-2003).
"Cisco ITP MAP Gateway for Public WLAN Slm Authentication and Authorization," Cisco Systems, Inc., pp. 1-13 (Copyright 1992-2003).
Loshin, "19.4: Network Address Translation," TCP/IP Clearly Explained, Fourth Edition, Morgan Kaufman Publishers, pp. 435-437 (2003).
Barry, "A Signal for Savings," Packet, Cisco Systems Users Magazine, vol. 14, No. 4, pp. Cover; 19-21; and 81 (Fourth Quarter 2002).
"Agilent Technologies and Cisco Systems SS7 Over IP White Paper," Cisco Systems, Inc. and Agilent and Technologies, pp. 1-6 (Copyright 2002—Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business intelligence," Agilent Technologies, pp. 1-6 (Copyright 2001—Printed in the UK Nov. 30, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Rockhold, "Or," Wireless Review, p. 22, 23, 26, 28, 30, 32, (Aug. 15, 2000).
"Topsail Beach—SS7 Over IP-" Cisco Systems, Inc., pp. 1-16 (Copyright 1999).
Smith, "Number Portability Pileup," Telephony, p. 22, 24, 26, (Jan. 6, 1997).
Jain et al., "Phone Nummer Portability for PCS Systems with ATM Backbones Using Distributed Dynamic Hashing," IEEE, vol. 15 (No. 1), p. 96-105, (Jan. 1997).
Heinmiller, "Generic Requirements for SCP Application and GTT Function for Number Portability," Illinois Number Portability Workshop, p. 1-50, (Sep. 4, 1996).
International Telecommunication Union, "Series Q: Switching and Signalling: Specifications of Signalling Systems No. 7—Signalling Connection Control Part," p. 11-16, (Jul. 1996).
Rice, "SS7 Networks in a PCS World," Telephony, pp. 138, 140 142, 144, 146, (Jun. 24, 1996).
Tekelec, "Eagle STP Planning Guide", Eagle Network Switching Division, (No. 3), p. i-vii, 1-64, A1-A2, B1-2, (May 1996).
Anonymous, "Generic Switching and Signaling Requirements for Number Portability," AT&T Network Systems, No. 1, p. 1-75, (Feb. 2, 1996).
ETSI, Digital Cellular Telecommunications System (Phase 2+); Milbe Application Part (MAP) Specification, Global System for Mobile Communications, pp. 112-114 (1996).
Jain, et al., "A Hashing Scheme for Phone Number Portability in PCS Systems with ATM Backbones," Bell Communications Research, p. 593-597, (1996).
Bishop, "Freeing the Network for Competition," Telecommunications, p. 75-80, (Apr. 1995).

(56) References Cited

OTHER PUBLICATIONS

Anonymous, "Zeichengabesysteme-Eine neue Generation für ISDN und intelligente Netze," Zeichengabesystem, Medien-Institut Bremen, p. iz-xi; 170-176, (Feb. 17, 1995).
Giordano et al., "PCS Number Portability," IEEE, p. 1146-1150, (Sep. 1994).
Bellcore, "Signaling Transfer Point (STP) Generic Requirements," Bell Communications Research, No. 1, p. ii-xxii, 4-84-J14, (Jun. 1994).
Telcordia Technologies, "CCS Network Interface Specification (CCSNIS) Supporting SCCP and TCAP," Bell Communications Research, p. ii-xii, 1-1—C-22, (Mar. 1994).
Buckles, "Very High Capacity Signaling Trnsfer Point for Intelligent Network Servcies," DSC Communciations Corporation, p. 1308-1311, (1988).
"Diameter Overview," referenced from www.ulticom.com/html/products/signalware-diameter-reference-guide.asp (Publication date unknown).
"Chapter 1: Overview," SS7 Port Adapter Installation and Configuration, pp. 1-1-1-8 (Publication Date Unknown).
"Configuring ITP Basic Functionality," IP Transfer Point, Cisco IOS Release 12.2(4)MB12, pp. 31-50 (Publication Date Unknown).
"Configuring ITP Optional Features," IP Transfer Point, Cisco IOS Release 12.294)MB12, pp. 65-136 (Publication Date Unknown).
"Configuring M3UA and SUA SS7 Over IP Signaling Gateways," IP Transfer Point, Cisco IOS Release 12.2(4)MB13, pp. 51-66 (Publication Date Unknown).
"Configuring M3UA and SUA SS7 Over IP Signaling Gateways," IP Transfer Point, Cisco IOS Release 12.2(4)MB10, pp. 49-62 (Publication Date Unknown).
Notice of Allowance and Fee(s) Due for U.S. Appl. No. 13/026,133 (dated Feb. 3, 2014).
Communication of European Publication Number and Information on the Application of Article 67(3) EPC for European Patent Application No. 12737038.5 (dated Oct. 30, 2013).
Non-Final Office Action for U.S. Appl. No. 13/026,133 (dated Aug. 19, 2013).
Notice of Allowance and Fee(s) Due for U.S. Appl. No. 12/906,998 (dated Jul. 31, 2013).
Letter regarding Office Action for Japanese Patent Application No. 2013-550580 (dated Oct. 27, 2015).
Non-Final Office Action for U.S. Appl. No. 14/107,818 (dated Sep. 18, 2015).
Notification of the First Office Action for Chinese Application No. 201280009801.3 (dated Jul. 22, 2015).
Commonly assigned, co-pending U.S. Appl. No. 14/794,369 for, "Methods, Systems, and Computer Readable Media for Communicating Radio Access Network Congestion Status Information for Large Numbers of Users," (Unpublished, filed Jul. 8, 2015).
3GPP, "3rd Generation Partnership Project; Technical Specification Group Core Network and Terminals; Nq and Nq' Application Protocol (Nq-Ap); Stage 3 (Release 13)," 3GPP TS 29.405 V0.3.0 (Feb. 2015).
3GPP, "3rd Generation Partnership Project; Technical Specification Group Services and System Aspects; Study on system enhancements for user plane congestion management (Release 13)," 3GPP TR 23.705 V1.2.0 (Nov. 2014.).
3GPP, "3rd Generation Partnership Project; Technical Specification Group Core Network and Terminals; Policy and Charging Control over Np reference point (Release 13)," 3GPP TS 29.217 V1.0.0 (Nov. 2014).
Pre-Acceptance Notice for Israel Patent Application No. 219214 (dated Apr. 29, 2015).
Letter Regarding Notice of Grant for Chinese Patent Applcation No. ZL201080056996.8 (dated Feb. 12, 2015).
Corrected Notice of Allowability for U.S. Appl. No. 12/906,816 (dated Dec. 2, 2014).
Letter Regarding Notification of Non-Substantial Deficiencies for Israel Patent Application No. 219214 (dated Nov. 17, 2014).
Notice of Allowance and Fee(s) Due for U.S. Appl. No. 12/906,816 (dated Oct. 7, 2014).
Notification of the Second Office Action for Chinese Application No. 201080056996.8 (dated Sep. 3, 2014).
Office Action for Israel Patent Application No. 219214 (dated Jul. 2, 2014).
Non-Final Office Action for U.S. Appl. No. 12/906,816 (dated Jun. 19, 2014).
Applicant-Initiated Interview Summary for U.S. Appl. No. 12/906,816 (dated May 15, 2014).
First Office Action for Chinese Application No. 201080056996.8 (dated Apr. 4, 2014).
Final Office Action for U.S. Appl. No. 12/906,816 (dated Feb. 11, 2014).
Applicant-Initiated Interview Summary for U.S. Appl. No. 12/906,816 (dated Jan. 10, 2014).
Non-Final Office Action for U.S. Appl. No. 12/906,816 (dated Oct. 1, 2013).
Communication of European publication number and information on the application of Article 67(3) EPC for European Application No. 10824243.9 (dated Jul. 25, 2012).
Advisory Action for U.S. Appl. No. 12/906,816 (dated Jun. 5, 2012).
Applicant-Initiated Interview Summary for U.S. Appl. No. 12/906,816 (dated May 17, 2012).
Final Official Action for U.S. Appl. No. 12/906,816 (dated Feb. 21, 2012).
Applicant-Initiated Interview Summary for U.S. Appl. No. 12/906,816 (dated Jan. 27, 2012).
Non-Final Official Action for U.S. Appl. No. 12/906,816 (dated Oct. 5, 2011).
Notification of Transmittal of the International Search Report and the Written Opinion of the International Searching Authority, or the Declaration for International Application No. PCT/US2010/053062 (dated Jun. 28, 2011).
Jones et al., "Diameter Command Code Registration for the Third Generation Partnership Project (3GPP) Evolved Packet System (EPS)," Network Working Group, RFC 5516, pp. 1-5 (Apr. 2009).
Advisory Action Before the Filing of an Appeal Brief for U.S. Appl. No. 14/107,818 (dated May 26, 2016).
Applicant-Initiated Interview Summary for U.S. Appl. No. 14/107,818 (dated May 24, 2016).
Notification of the Second Office Action for Chinese Application No. 201280009801.3 (dated Apr. 5, 2016).
Letter Regarding Issued Patent for Japanese Patent Registration No. 5885757 (dated Mar. 15, 2016).
Final Office Action for U.S. Appl. No. 14/107,818 (dated Feb. 11, 2016).
Letter Regarding Notice of Grant for Japanese Patent Application No. 2013-556855 (dated Feb. 2, 2016).
Office action for U.S. Appl. No. 14/107,818 (dated Jul. 5, 2016).
Letter regarding Decision to Grant for Chinese Patent Application No. ZL201280009201.3 (dated Jan. 20, 2017).
Notice of Allowance and Fee(s) Due for U.S. Appl. No. 14/107,818 (dated Dec. 27, 2016).
Non-Final Office Action for U.S. Appl. No. 14/794,369 (dated Dec. 30, 2016).
Applicant Initated Interview Summary for U.S. Appl. No. 14/107,818 (dated Oct. 24, 2016).
Letter regarding Office Action for Chinese Patent Application No. 201280009801.3 (dated Sep. 19, 2016).
Eronen et al., "Diameter Extensible Authentication Protocol (EAP) Application," https://www.ietf.org/rfc/rfc4072.txt, pp. 1-31 (Aug. 2005).
Fajardo, "Open Diameter Routing Architecture," http://diameter.sourceforge.net/diameter-routing/, pp. 1-5 (Jun. 25, 2004).
Extended European Search Report for European Application No. 10824243.9 (dated Jun. 8, 2017).
Corrected Notice of Allowability for U.S. Appl. No. 14/107,818 (dated Apr. 11, 2017).
Extended European Search Report for European Application No. 12737038.5 (dated Mar. 16, 2017).
Advisory Action, Examiner-Initiated Interview Summary and AFCP 2.0 Decision for U.S. Appl. No. 14/794,369 (dated Sep. 29, 2017).

(56) References Cited

OTHER PUBLICATIONS

Final Office Action for U.S. Appl. No. 14/794,369 (dated Jul. 11, 2017).

* cited by examiner

Application-Level Whitelist Rules

| Origin Host | Origin Realm | Destination Host | Destination Realm | Whitelisted Application ID | Screening Action |
|---|---|---|---|---|---|
| MME_Visited | Visited.net | * | Home.net | 16777251 | Update Usage & Measurements Log |
| MME_Visited | Visited.net | * | Home.net | 16777267 | none |

600

Application-Level Blacklist Rules

| Origin Host | Origin Realm | Destination Host | Destination Realm | Blacklisted Application ID | Screening Action |
|---|---|---|---|---|---|
| MME_Visited | Visited.net | * | Home.net | 16777251 | Discard Message |
| MME_Visited | Visited.net | * | Home.net | 16777267 | Route And Notify Network Operator |

Message-Level Whitelist Rules

| Origin Host | Origin Realm | Destination Host | Destination Realm | Application ID | Whitelisted Message Code(s) (e.g., Command Code) | Screening Action |
|---|---|---|---|---|---|---|
| MME_Visited | Visited.net | * | Home.net | 16777251 | * | Update Usage & Measurements Log |
| MME_Visited | Visited.net | * | Home.net | 16777251 | 316, 318, 321 | none |

700

Message-Level Blacklist Rules

| Origin Host | Origin Realm | Destination Host | Destination Realm | Application ID | Blacklisted Message Code(s) (e.g., Command Code) | Screening Action |
|---|---|---|---|---|---|---|
| MME_Visited | Visited.net | * | Home.net | 16777251 | 317 | Discard Message |
| MME_Visited | Visited.net | * | Home.net | 16777251 | 322 | Route And Notify Network Operator |
| MME_Visited | Visited.net | * | Home.net | 16777267 | * | Reply With Error Message |

Message_AVP-Level Whitelist Rules

| Origin Host | Origin Realm | Destination Host | Destination Realm | Application ID | Whitelisted Message Code(s) (e.g., Command Code) | Whitelisted AVP Code(s) | Screening Action |
|---|---|---|---|---|---|---|---|
| MME1 | Visited.net | * | Home.net | 16777251 | 316 | 266 | Update Usage & Measurements Log |

800

Message_AVP-Level Blacklist Rules

| Origin Host | Origin Realm | Destination Host | Destination Realm | Application ID | Blacklisted Message Code(s) (e.g., Command Code) | Blacklisted AVP Code(s) | Screening Action |
|---|---|---|---|---|---|---|---|
| MME1 | Visited.net | * | Home.net | 16777251 | 316 | 1401 | Modify Message – Remove AVP |

Message_AVP_Value-Level Information Element Whitelist Rules

| Origin Host | Origin Realm | Destination Host | Destination Realm | Application ID | Message Code (e.g., Command Code) | AVP Code | Permitted Value(s) | Screening Action |
|---|---|---|---|---|---|---|---|---|
| vMME | Visited.net | * | Home.net | 16777251 | 316 | 1407 | 20801 | Update Usage & Measurements Log |
| vMME | Visited.net | * | Home.net | 16777251 | 316 | 1032 | E-UTRAN | Notify Network Operator |

900

Message_AVP_Value-Level Information Element Blacklist Rules

| Origin Host | Origin Realm | Destination Host | Destination Realm | Application ID | Message Code (e.g., Command Code) | AVP Code | Prohibited Value(s) | Screening Action |
|---|---|---|---|---|---|---|---|---|
| vMME | Visited.net | * | Home.net | 16777251 | 316 | 1407 | 20801 | Modify Message – Remove AVP value |
| vMME | Visited.net | * | Home.net | 16777251 | 316 | 1032 | E-UTRAN | Route and Notify Network Operator |

Message-Level MaxRate Rules

| Origin Host | Origin Realm | Destination Host | Destination Realm | Application ID | Message Code(s) (e.g., Command Code) | Maximum Receipt Rate (e.g., msg/sec) | Screening Action |
|---|---|---|---|---|---|---|---|
| MME_Visited | Visited.net | * | Home.net | 16777251 | 322 | 100 | Route And Notify Network Operator |
| MME_Visited | Visited.net | * | Home.net | 16777267 | * | 500 | Route And Notify Network Operator |

METHODS, SYSTEMS, AND COMPUTER READABLE MEDIA FOR SCREENING DIAMETER MESSAGES WITHIN A DIAMETER SIGNALING ROUTER (DSR) HAVING A DISTRIBUTED MESSAGE PROCESSOR ARCHITECTURE

PRIORITY CLAIM

This application claims the benefit of U.S. Provisional Patent Application Ser. No. 61/435,102, filed Jan. 21, 2011; the disclosure of which is incorporated herein by reference in its entirety.

TECHNICAL FIELD

The subject matter described herein relates to screening Diameter messages within a Diameter signaling router (DSR) having a distributed message processor architecture. More specifically, the subject matter relates to methods, systems, and computer readable media for screening Diameter messages within a DSR having a distributed message processor architecture.

BACKGROUND

The Diameter protocol is a next generation authentication, authorization, and accounting (AAA) protocol. The Diameter base protocol is defined in IETF RFC 3588, the disclosure of which is incorporated by reference herein in its entirety. Commonly used within the Internet multimedia subsystem (IMS) architecture, the Diameter protocol was derived from the remote authentication dial-in user service (RADIUS) protocol. Historically, the RADIUS protocol was employed by Internet service providers (ISPs) to provide a secure communication channel between an ISP's access server and a secure location where user credential information was stored, e.g., a lightweight directory access protocol (LDAP) server. While the RADIUS protocol provided a standardized AAA exchange protocol, the emergence of new technologies and applications necessitated the development of a protocol capable of meeting ever-changing demands. Diameter aims to extend the standardized approach of RADIUS while providing expanded functionality and remaining open to future development.

As the prevalence of the Diameter protocol increases within providers' telecommunication networks, many providers are turning to distributed architectures for processing and routing the accompanying increase in volume of Diameter message traffic. While a distributed architecture may offer a provider advantages such as load balancing and redundancy, it also presents various issues. One such issue is providing for the screening of Diameter messages within such a distributed architecture.

Accordingly, a need exists for methods, systems, and computer readable media for screening Diameter messages within a DSR having a distributed message processor architecture.

SUMMARY

According to one aspect, the subject matter described herein includes a method for screening Diameter messages within a Diameter signaling router (DSR) having a distributed message processor architecture. The method includes steps occurring at a DSR comprising a plurality of Diameter message processors, each configured to perform at least one Diameter function. The steps include receiving, at an ingress Diameter message processor of the Diameter message processors, a Diameter message from a Diameter peer node. The steps also include identifying, at a Diameter application message processor of the Diameter message processors, a Diameter message screening rule associated with the received Diameter message. The steps further include performing, at the Diameter application message processor of the Diameter message processors, a screening function associated with the identified Diameter message screening rule on the received Diameter message.

According to another aspect, the subject matter described herein includes a system for screening Diameter messages within a DSR having a distributed message processor architecture. The system includes a DSR. The DSR includes an ingress Diameter message processor configured to receive a Diameter message from a Diameter peer node. The DSR also includes a Diameter application message processor configured to identify a Diameter message screening rule associated with the received Diameter message and perform a screening function associated with the identified Diameter message screening rule on the received Diameter message.

As used herein, the term "node" refers to a physical computing platform including one or more processors and memory.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 6 is a set of exemplary application level screening rule tables for screening Diameter messages within a DSR having a distributed message processor architecture according to an embodiment of the subject matter described herein;

FIG. 7 is a set of exemplary message level screening rule tables for screening Diameter messages within a DSR having a distributed message processor architecture according to an embodiment of the subject matter described herein;

FIG. 8 is a set of exemplary message attribute value pair (AVP) level rule tables for screening Diameter messages within a DSR having a distributed message processor architecture according to an embodiment of the subject matter described herein;

FIG. 9 is a set of exemplary message AVP value level screening rule tables for screening Diameter messages within a DSR having a distributed message processor architecture according to an embodiment of the subject matter described herein;

FIG. 10 is an exemplary maximum rate rules table for screening Diameter messages within a DSR having a distributed message processor architecture according to an embodiment of the subject matter described herein.

DETAILED DESCRIPTION

Figure 1:
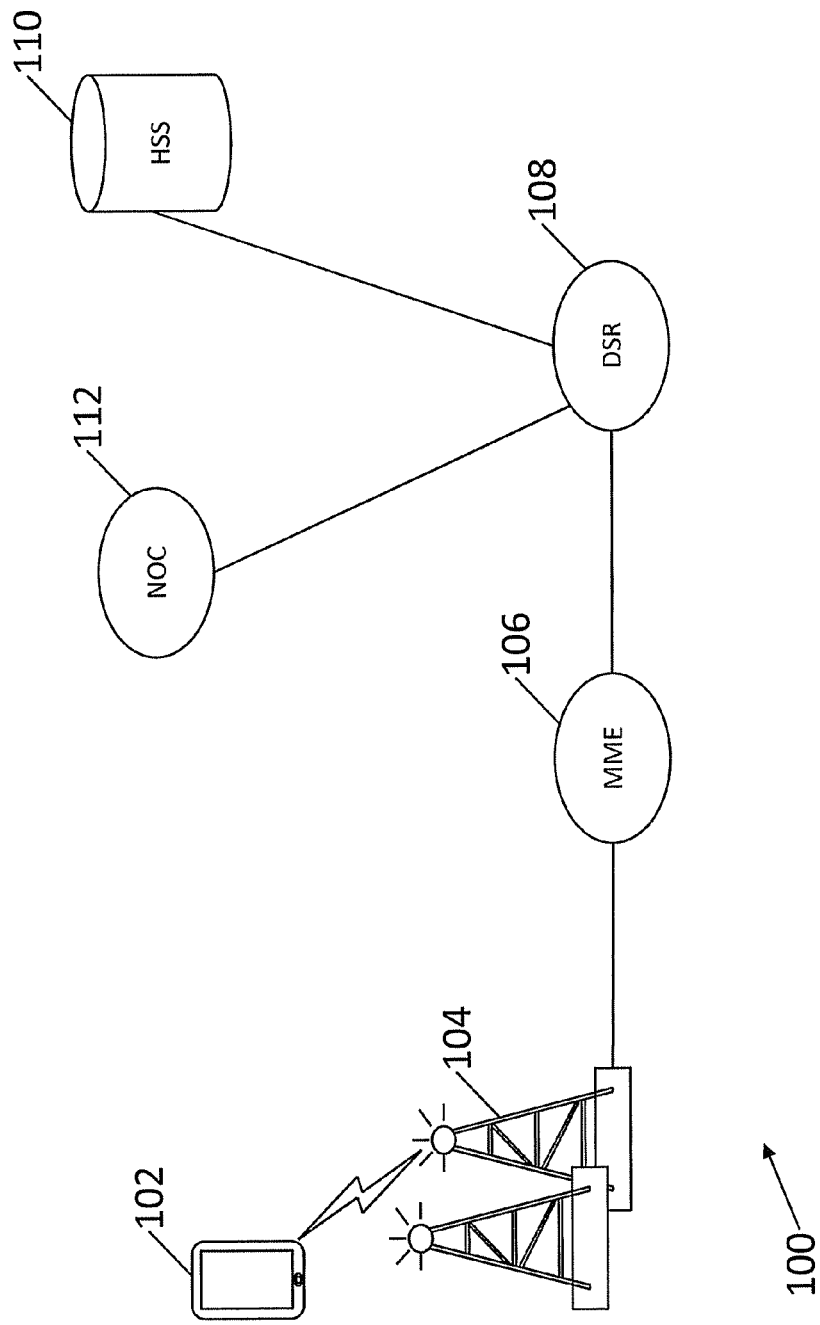
FIG. 1 is a network diagram illustrating an exemplary network environment for screening Diameter messages within a DSR having a distributed message processor architecture according to an embodiment of the subject matter described herein.

Methods, systems, and computer readable media for screening Diameter messages within a DSR having a distributed message processor architecture are provided. FIG. 1 is a network diagram illustrating an exemplary network environment for screening Diameter messages within a DSR having a distributed message processor architecture according to an embodiment of the subject matter described herein. Referring to FIG. 1, network environment 100 may include one or more user equipment (UE) nodes. For example, network environment 100 may include UE 102. UE 102 may be any device capable of communicating within network environment 100, for example, a mobile handset, smart phone, tablet computer, laptop computer, etc. UE 102 may utilize one or more nodeBs or enhanced nodeBs (eNodeBs) to communicate within network environment 100. For example, UE 102 may utilize eNodeB 104 to communicate within network environment 100. eNodeB 104 may be operative to communicate with one or more mobility management entity (MME) nodes. For example, eNodeB 104 may be operative to communicate with MME node 106. MME node 106 may be configured to track one or more UEs, for example UE 102, within network environment 100, and may communicate information (e.g., mobility-related information) to one or more other nodes within network environment 100, for example via Diameter messages. Network environment 100 or a subsection thereof, may employ one or more DSR nodes for routing Diameter messages. For example, network environment 100 may include DSR node 108. DSR node 108 may utilize a distributed architecture and may include one or more Diameter message processors, each of which may be configured to perform one or more Diameter functions. DSR node 108 may be operative to communicate with one or more other nodes within network environment 100. For example, DSR node 108 may be operative to communicate with HSS node 110. HSS node 110 may maintain subscriber-related information, such as user identification information, control information for user authentication and authorization, location information, and/or user profile data. DSR node 108 may also be operative to communicate with network operations center (NOC) node 112. NOC node 112 may be a central control point for network environment 100 or a portion thereof, and may thus send and/or receive one or messages related to network status from various nodes within network environment 100 (e.g., DSR node 108). As will be discussed in greater detail below, in accordance with embodiments of the subject matter described herein, DSR node 108 may be configured to perform one or more screening functions on Diameter messages within network environment 100.

Figure 2:
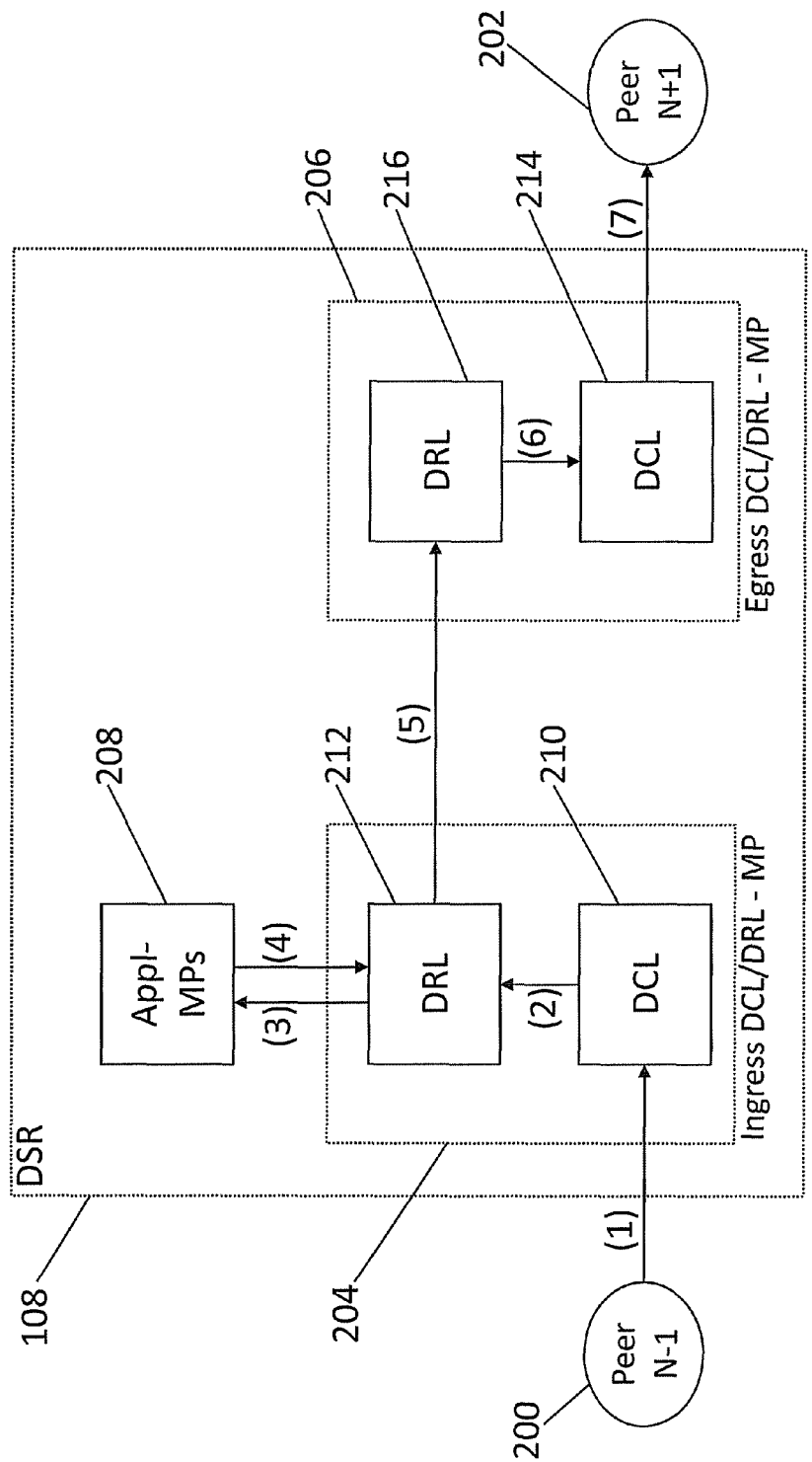
FIG. 2 is a block diagram illustrating an exemplary distributed DSR architecture for screening Diameter messages within a DSR having a distributed message processor architecture according to an embodiment of the subject matter described herein.

FIG. 2 is a block diagram illustrating an exemplary distributed DSR architecture for screening Diameter messages within a DSR having a distributed message processor architecture according to an embodiment of the subject matter described herein. Referring to FIG. 2, DSR node 108 may be operative to communicate with one or more Diameter peer nodes. For example, DSR node 108 may be operative to communicate with Diameter peer nodes 200 and 202. Diameter peer nodes 200 and 202 may be any Diameter nodes capable of communicating with DSR node 108. For example, Diameter peer node 200 may correspond to MME node 106 and Diameter peer node 202 may correspond to HSS node 110. DSR node 108 may utilize a distributed architecture and may include one or more message processors for performing one or more Diameter functions. For example, DSR node 108 may include Diameter message processors 204, 206, and 208. Each of Diameter message processors 204, 206, and 208 may be configured to perform one or more Diameter functions for Diameter messages processed by DSR node 108. For example, Diameter message processor 204 may be configured as an ingress Diameter message processor, Diameter message processor 206 may be configured as an egress Diameter message processor, and Diameter message processor 208 may be configured as a Diameter application message processor. As an ingress Diameter message processor, Diameter message processor 204 may include Diameter connection layer (DCL) 210 and Diameter routing layer (DRL) 212. DCL 210 may be a software layer of the Diameter stack that implements Diameter transport connections for inbound Diameter messages and DRL 212 may be a software layer of the Diameter stack that implements Diameter routing for inbound Diameter messages. Similarly, as an egress Diameter message processor, Diameter message processor 206 may include DCL 214 and DRL 216. DCL 214 may be a software layer of the Diameter stack that implements Diameter transport connections for outbound Diameter messages and DRL 216 may be a software layer of the Diameter stack that implements Diameter routing for outbound Diameter messages.

As indicated above, Diameter message processor 208 may be configured as a Diameter application message processor. In accordance with embodiments of the subject matter described herein, Diameter message processor 208 may be configured to screen Diameter messages within DSR node 108. For example, in an exemplary routing scenario, at step 1, DSR node 108 may receive, via a communication interface (not illustrated), an inbound Diameter message from Diameter peer node 200. The inbound Diameter message may be received via ingress Diameter message processor 204's DCL 210. At step 2, the Diameter message may be forwarded to ingress Diameter message processor 204's DRL 212 for any required inbound Diameter routing functions. At step 3, DRL 212 may forward the Diameter message to Diameter application message processor 208. Diameter application message processor 208 may be dedicated to performing one or more Diameter screening functions. As will be described in greater detail below, Diameter application message processor 208 may identify one or more Diameter message screening rules associated with the received Diameter message. In some embodiments, Diameter application message processor 208 may be configured to identify one or more screening rules associated with the received Diameter message based on one or more of a Diameter connection over which the received Diameter message was received, a Diameter session of which the received Diameter message is a part, an origin host associated with the received Diameter message, an origin realm associated with the received Diameter message, a source Internet protocol (IP) address associated with the received Diameter message, a destination host associated with the received Diameter message, a destination realm associated with the received Diameter message, a Diameter connection over which the received Diameter message will be sent, a destination IP address to which the received Diameter message will be sent, a Diameter application identifier associated with the received Diameter message, a Diameter message command code associated with the received Diameter message, an attribute value pair (AVP) code associated with the received Diameter message, and an AVP data value associated with the received Diameter message.

Having identified one or more screening rules associated with the received Diameter message, Diameter application message processor 208 may perform one or more screening functions associated with the one or more identified Diameter message screening rules on the received Diameter message. For example, Diameter application message processor 208 may discard the received Diameter message, may modify the received Diameter message, and/or may update one or more usage or measurement statistics associated with the received Diameter message. Having performed one or more Diameter screening functions on the received Diameter message, at step 4, Diameter application message processor 208 may forward the Diameter message back to ingress Diameter message processor 204's DRL 212. At step 5, ingress Diameter message processor 204's DRL 212 may forward the Diameter message to egress Diameter message processor 206's DRL 216 which may perform any required egress routing functions. At step 6, DRL 216 may forward the Diameter message to egress Diameter message processor 206's DCL 214 for communication, at step 7, to Diameter peer node 202.

Figure 3:
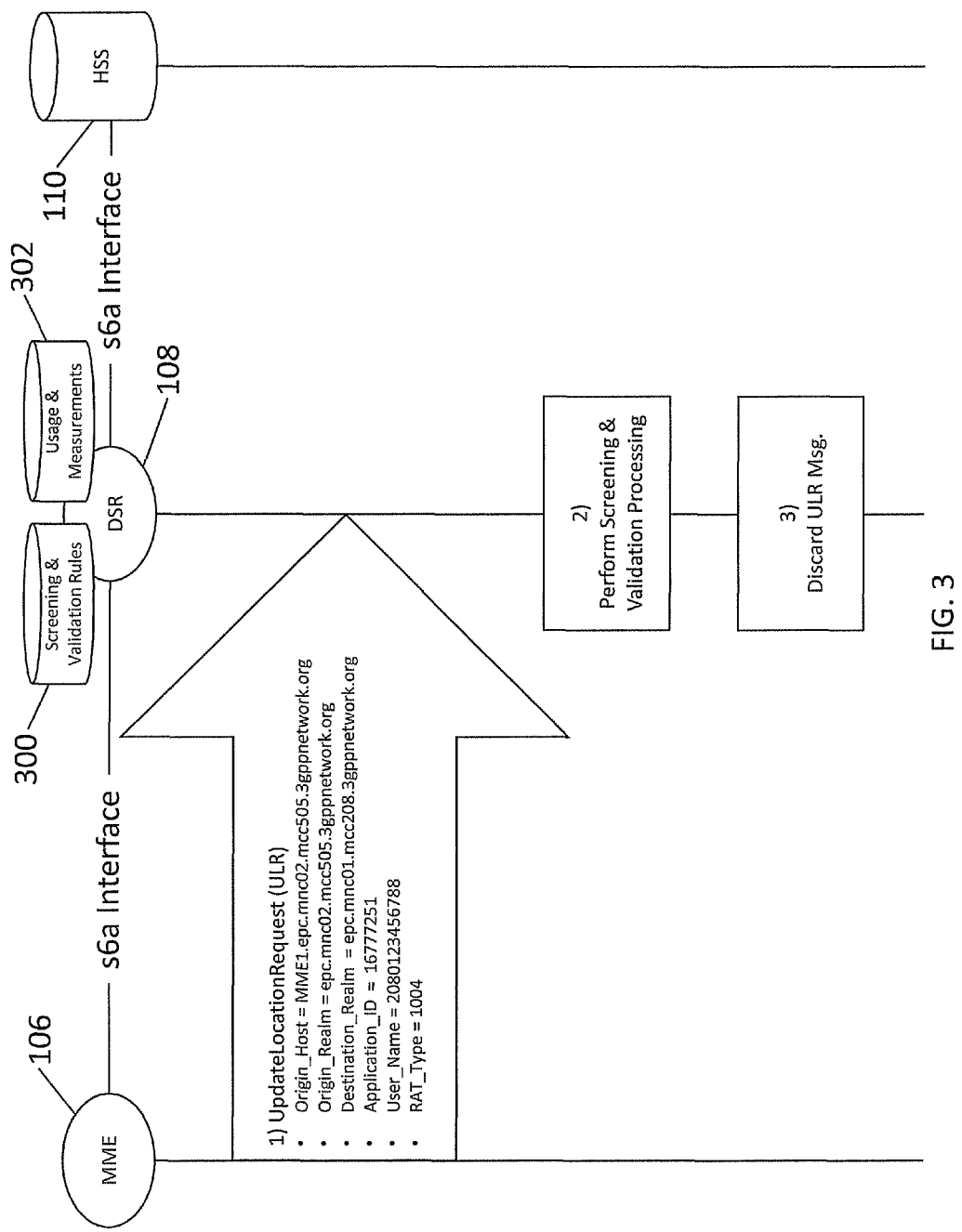
FIG. 3 is a message flow diagram illustrating an exemplary message sequence in which an update location request (ULR) message is screened and discarded by a DSR having a distributed message processor architecture according to an embodiment of the subject matter described herein.

FIG. 3 is a message flow diagram illustrating an exemplary message sequence in which a ULR message is screened and discarded by a DSR having a distributed message processor architecture according to an embodiment of the subject matter described herein. Referring to FIG. 3, at step 1, MME node 106 may transmit a ULR message (e.g., a ULR message associated with UE 102) to HSS node 110. En route to HSS node 110, the ULR message may be routed through DSR node 108. Having received the ULR message, at step 2, DSR node 108 may perform screening and validation processing for the ULR message. For example, DSR node 108's Diameter application message processor 208 may identify a Diameter message screening rule associated with the ULR message from among one or more Diameter message screening rules stored in Diameter screening and validation rules database 300. As will be described in greater detail below, the identified Diameter message screening rule(s) may specify one or more screening functions to perform on a received Diameter message matching one or more parameters specified by the rule(s). For example, Diameter application message processor 208 may identify a Diameter message screening rule that specifies that Diameter messages received from origin host "MME1.epc.mnc02.mcc505.3gppnetwork.org" (i.e., Diameter messages received from MME node 106) should be discarded. At step 3, Diameter application message processor 208 may perform the screening function specified by the identified Diameter message screening rule(s). For example, Diameter application message processor 208 may discard the ULR message from MME node 106, rather than routing the ULR message to HSS node 110.

As will be described in greater detail below, in some embodiments Diameter application message processor 208 may identify a Diameter message screening rule that specifies that one or more usage or measurement statistics associated with the identified Diameter message screening rule should be updated. For example, Diameter application message processor 208 may identify a Diameter message screening rule from Diameter message screening and validation rules database 300 that specifies that when a Diameter message associated with MME node 106 is received by DSR 108, a current receipt rate associated with the identified Diameter message screening rule should be updated to reflect receipt of the Diameter message. In some embodiments, the identified Diameter message screening rule may specify a maximum receipt rate for Diameter messages associated with the Diameter message screening rule. Such a Diameter message screening rule may further specify a screening function that should be performed when the current receipt rate exceeds the maximum receipt rate for the Diameter message screening rule. For example, a Diameter message screening rule may specify that when the current receipt rate exceeds the maximum receipt rate for the Diameter message screening rule, any Diameter messages associated with the Diameter message screening rule should be discarded. DSR node 108 may be operative to communicate with a usage and measurement statistics database 302 for storing usage and measurement statistics (e.g., current receipt rates) and/or maximum receipt rates.

Figure 4:
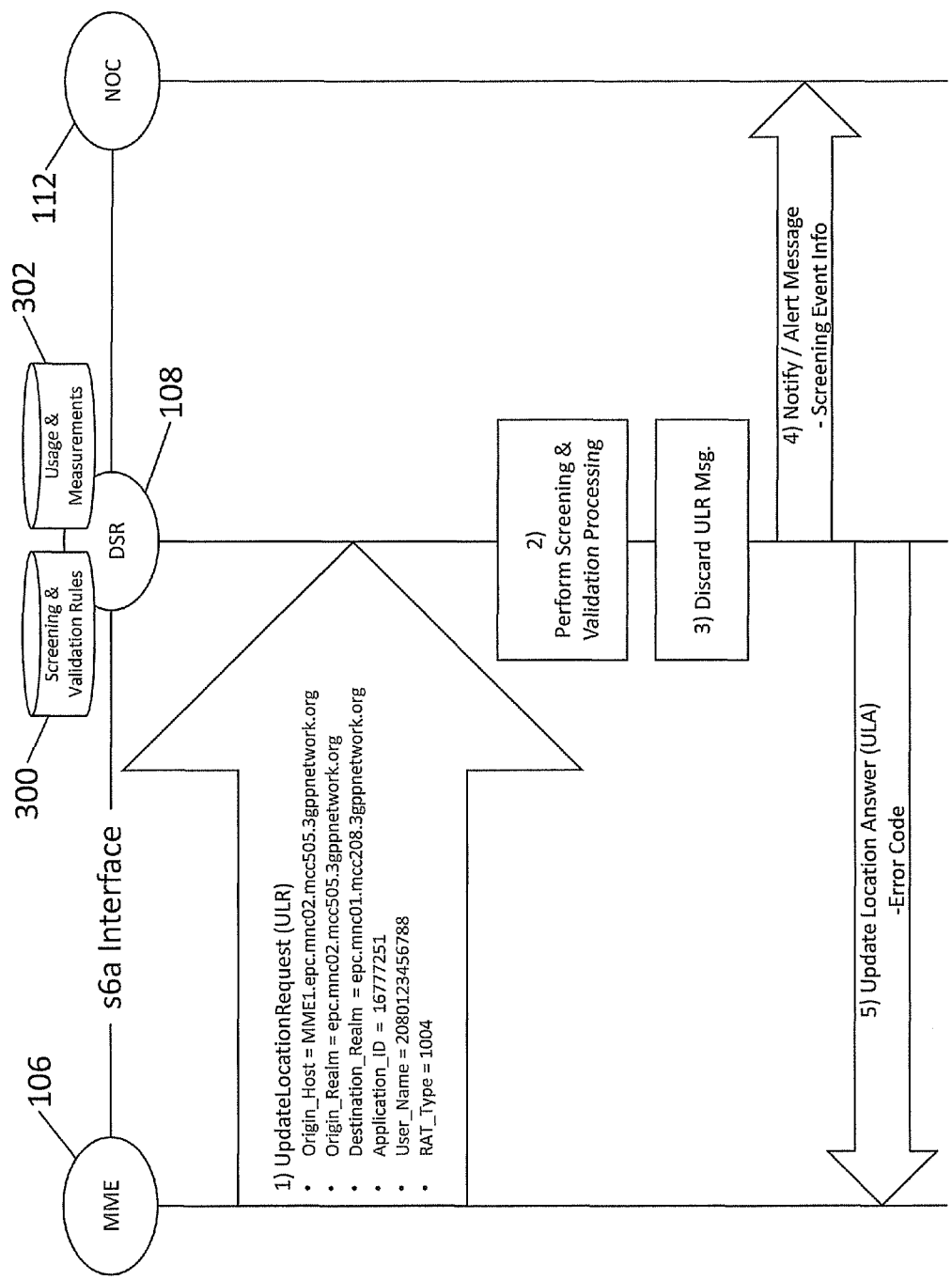
FIG. 4 is a message flow diagram illustrating an exemplary message sequence in which a ULR message is screened and a screening event notification message is generated and communicated to a network operations center (NOC) node by a DSR having a distributed message processor architecture according to an embodiment of the subject matter described herein.

FIG. 4 is a message flow diagram illustrating an exemplary message sequence in which a ULR message is screened and a screening event notification message is generated and communicated to a NOC node by a DSR having a distributed message processor architecture according to an embodiment of the subject matter described herein. Referring to FIG. 4, at step 1, MME node 106 may transmit a ULR message (e.g., a ULR message associated with UE 102) to HSS node 110. En route to HSS node 110, the ULR message may be routed through DSR node 108. Having received the ULR message, at step 2, DSR node 108 may perform screening and validation processing for the ULR message. For example, DSR node 108's Diameter application message processor 208 may identify a Diameter message screening rule associated with the ULR message from among one or more Diameter message screening rules stored in Diameter screening and validation rules database 300. The identified Diameter message screening rule may specify, for example, that a current receipt rate for Diameter messages associated with MME node 106 should be updated to reflect receipt of the ULR message. The identified Diameter message screening rule may further specify a maximum receipt rate for Diameter messages received from MME node 106, and may specify a screening function that should be performed if the updated current receipt rate exceeds the specified maximum receipt rate. For example, the identified Diameter message screening rule may specify that if the updated receipt rate exceeds the specified maximum receipt rate, any additional Diameter messages received from MME node 106 (e.g., the received ULR message) should be discarded, a screening event notification message should be generated and communicated to NOC node 112, and/or an error message should be generated and communicated to MME node 106 (e.g., an update location answer (ULA) message containing an error code).

Upon updating the current receipt rate associated with the identified Diameter message screening rule, Diameter application message processor 208 may determine that the current receipt rate associated with the identified Diameter message screening rule exceeds the maximum receipt rate specified by the identified Diameter message screening rule, and in response to making such a determination may perform the screening function(s) specified by the identified Diameter message screening rule. For example, at step 3, Diameter application message processor 208 may discard the ULR message received from MME node 106 rather than communicating it to HSS node 110. At step 4, Diameter application message processor 208 may generate a screening event notification message (e.g., a screening event notification message indicating that DSR node 108 has exceeded its maximum receipt rate for messages associated with the identified Diameter message screening rule) and communicate the screening event notification message to NOC node 112. At step 5, Diameter application message processor 208 may generate and communicate to MME node 106 a ULA message containing an error code (e.g., an error code indicating that the ULR message could not be communicated to HSS node 110).

Figure 5:
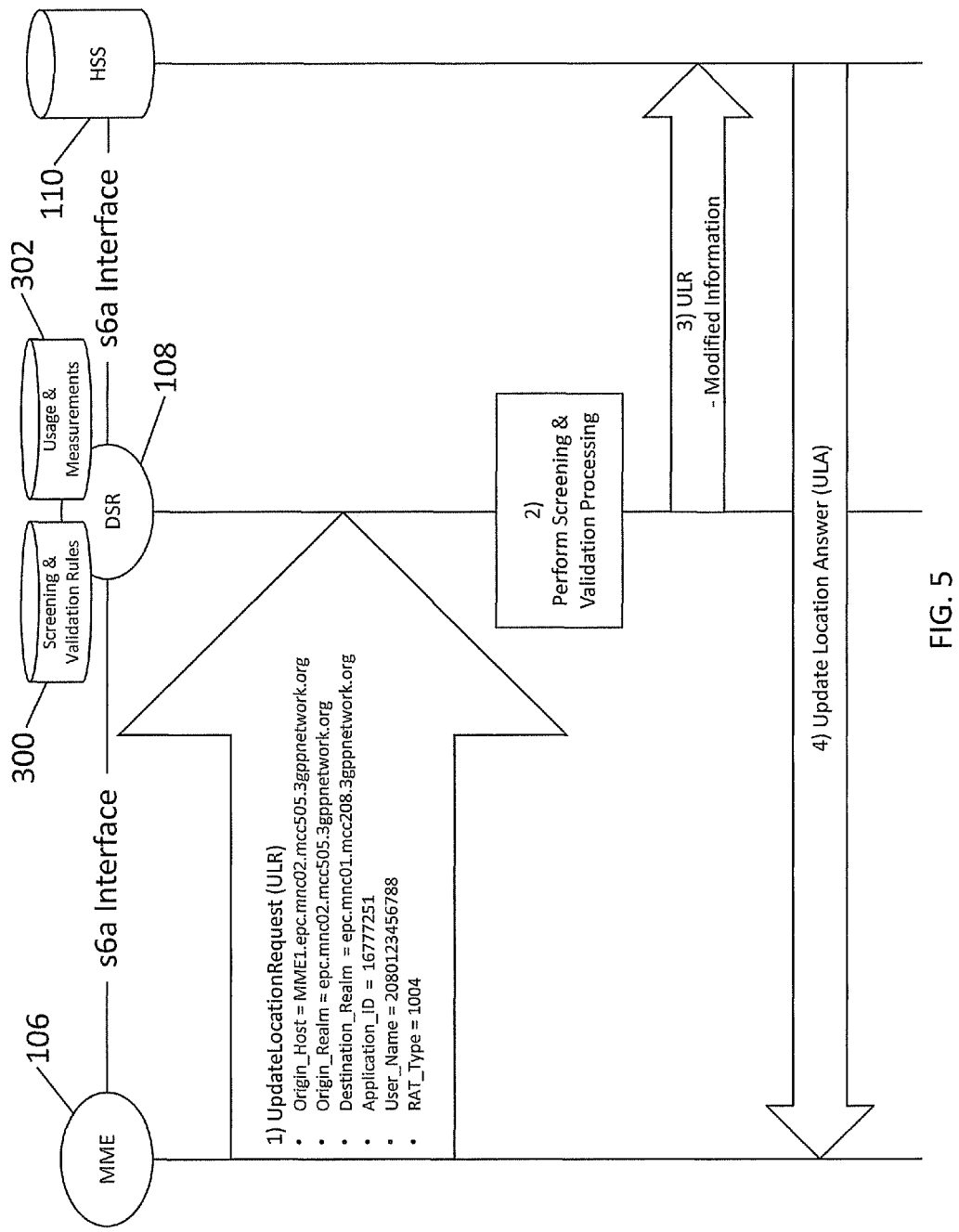
FIG. 5 is a message flow diagram illustrating an exemplary message sequence in which a ULR message is screened, modified, and communicated to a home subscriber server (HSS) node by a DSR having a distributed message processor architecture according to an embodiment of the subject matter described herein.

FIG. 5 is a message flow diagram illustrating an exemplary message sequence in which a ULR message is screened, modified, and communicated to an HSS node by a DSR having a distributed message processor architecture according to an embodiment of the subject matter described herein. Referring to FIG. 5, at step 1, MME node 106 may transmit a ULR message (e.g., a ULR message associated with UE 102) to HSS node 110. En route to HSS node 110, the ULR message may be routed through DSR node 108. Having received the ULR message, at step 2, DSR node 108 may perform screening and validation processing for the ULR message. For example, DSR node 108's Diameter application message processor 208 may identify a Diameter message screening rule associated with the ULR message from among one or more Diameter message screening rules stored in Diameter screening and validation rules database 300. The identified Diameter message screening rule may specify, for example, that Diameter messages associated with the Diameter message screening rule should be modified. For example, the identified Diameter message screening rule may specify that Diameter messages associated with the Diameter message screening rule have an AVP value changed, an AVP value added, and/or an existing AVP value deleted. Diameter application message processor 208 may perform the specified modification on the received ULR message and, at step 3, DSR 108 may forward the modified ULR message to HSS node 110. Having received the modified ULR message, at step 4, HSS node 110 may generate and communicate to MME node 106 an associated ULA message.

FIG. 6 is a set of exemplary application level screening rule tables for screening Diameter messages within a DSR having a distributed message processor architecture according to an embodiment of the subject matter described herein. Referring to FIG. 6, table 600 may specify one or more application level "whitelist" rules. That is, table 600 may include one or more Diameter message screening rules that specify Diameter applications for which associated Diameter messages should be allowed and/or one or more screening functions that should be performed on the associated Diameter messages. For example, table 600 includes an entry specifying that Diameter messages having an origin host "MME_Visited"; an origin realm "Visited.net"; any destination host; a destination realm "Home.net"; and an application identifier "16777251", should be allowed and that usage and measurement logs should be updated to reflect receipt of such messages. Table 600, also includes an entry specifying that Diameter messages having an origin host "MME_Visited"; an origin realm "Visited.net"; any destination host; a destination realm "Home.net"; and an application identifier "16777267", should be allowed and no screening action need be performed.

Similarly, table 602 may specify one or more application level "blacklist" rules. That is, table 602 may include one or more Diameter message screening rules that specify Diameter applications for which associated Diameter messages should not be allowed and/or one or more screening functions that should be performed on the associated Diameter messages. For example, table 602 includes an entry specifying that Diameter messages having an origin host "MME_Visited"; an origin realm "Visited.net"; any destination host; a destination realm "Home.net"; and an application identifier "16777251", should not be allowed and that such messages should be discarded. Table 602, also includes an entry specifying that Diameter messages having an origin host "MME_Visited"; an origin realm "Visited.net"; any destination host; a destination realm "Home.net"; and an application identifier "16777267", should not be allowed and such messages should be routed and the network operator notified.

FIG. 7 is a set of exemplary message level screening rule tables for screening Diameter messages within a DSR having a distributed message processor architecture according to an embodiment of the subject matter described herein. Referring to FIG. 7, table 700 may specify one or more message level "whitelist" rules. That is, table 700 may include one or more Diameter message screening rules that specify Diameter message codes for which associated Diameter messages should be allowed and/or one or more screening functions that should be performed on the associated Diameter messages. For example, table 700 includes an entry specifying that Diameter messages having an origin host "MME_Visited"; an origin realm "Visited.net"; any destination host; a destination realm "Home.net"; an application identifier "16777251"; and any message code, should be allowed and that usage and measurement logs should be updated to reflect receipt of such messages. Table 700, also includes an entry specifying that Diameter messages having an origin host "MME_Visited", an origin realm "Visited-.net"; any destination host; a destination realm "Home.net"; an application identifier "16777251"; and a message code of "316", "318", or "321", should be allowed and no screening action need be performed.

Similarly, table 702 may specify one or more message level "blacklist" rules. That is, table 702 may include one or more Diameter message screening rules that specify Diameter message codes for which associated Diameter messages should not be allowed and/or one or more screening functions that should be performed on the associated Diameter messages. For example, table 702 includes an entry specifying that Diameter messages having an origin host "MME_Visited"; an origin realm "Visited.net"; any destination host; a destination realm "Home.net"; an application identifier "16777251"; and a message code "317", should not be allowed and that such messages should be discarded. Table 702, also includes an entry specifying that Diameter messages having an origin host "MME_Visited"; an origin realm "Visited.net"; any destination host; a destination realm "Home.net"; an application identifier "16777251"; and a message code "322", should not be allowed and such messages should be routed and the network operator notified. Table 702, further includes an entry specifying that Diameter messages having an origin host "MME_Visited"; an origin realm "Visited.net"; any destination host; a destination realm "Home.net"; an application identifier "16777267"; and any message code, should not be allowed and a reply with error message should be generated and communicated in response to such messages.

FIG. 8 is a set of exemplary message AVP level rule tables for screening Diameter messages within a DSR having a distributed message processor architecture according to an embodiment of the subject matter described herein. Referring to FIG. 8, table 800 may specify one or more AVP level "whitelist" rules. That is, table 800 may include one or more Diameter message screening rules that specify Diameter message AVP codes for which associated Diameter messages should be allowed and/or one or more screening functions that should be performed on the associated Diameter messages. For example, table 800 includes an entry specifying that Diameter messages having an origin host "MME1"; an origin realm "Visited.net"; any destination host; a destination realm "Home.net"; an application identifier "16777251"; a message code "316"; and an AVP code "266", should be allowed and that usage and measurement logs should be updated to reflect receipt of such messages.

Similarly, table 802 may specify one or more AVP level "blacklist" rules. That is, table 802 may include one or more Diameter message screening rules that specify Diameter message AVP codes for which associated Diameter messages should not be allowed and/or one or more screening functions that should be performed on the associated Diameter messages. For example, table 802 includes an entry specifying that Diameter messages having an origin host "MME1"; an origin realm "Visited.net"; any destination host; a destination realm "Home.net"; an application identifier "16777251"; a message code "316"; and an AVP code "1401", should not be allowed and that such messages should be modified to remove the AVP code.

FIG. 9 is a set of exemplary message AVP value level screening rule tables for screening Diameter messages within a DSR having a distributed message processor architecture according to an embodiment of the subject matter described herein. Referring to FIG. 9, table 900 may specify one or more AVP value level "whitelist" rules. That is, table 900 may include one or more Diameter message screening rules that specify Diameter message AVP values for which associated Diameter messages should be allowed and/or one or more screening functions that should be performed on the associated Diameter messages. For example, table 900 includes an entry specifying that Diameter messages having an origin host "vMME"; an origin realm "Visited.net"; any destination host; a destination realm "Home.net"; an application identifier "16777251"; a message code "316"; an AVP code "1407"; and an AVP value "20801", should be allowed and that usage and measurement logs should be updated to reflect receipt of such messages. Table 900 also includes an entry specifying that Diameter messages having an origin host "vMME"; an origin realm "Visited.net"; any destination host; a destination realm "Home.net"; an application identifier "16777251"; a message code "316"; an AVP code "1032"; and an AVP value "E-UTRAN", should be allowed and that the network operator should be notified upon receipt of such messages.

Similarly, table 902 may specify one or more AVP value level "blacklist" rules. That is, table 902 may include one or more Diameter message screening rules that specify Diameter message AVP values for which associated Diameter messages should not be allowed and/or one or more screening functions that should be performed on the associated Diameter messages. For example, table 902 includes an entry specifying that Diameter messages having an origin host "vMME"; an origin realm "Visited.net"; any destination host; a destination realm "Home.net"; an application identifier "16777251"; a message code "316"; an AVP code "1407"; and an AVP value "20801", should not be allowed and that such messages should be modified to remove the AVP value. Table 902 also includes an entry specifying that Diameter messages having an origin host "vMME"; an origin realm "Visited.net"; any destination host; a destination realm "Home.net"; an application identifier "16777251"; a message code "316"; an AVP code "1032"; and an AVP value "E-UTRAN", should not be allowed and that such messages should be routed and the network operator notified.

FIG. 10 is an exemplary maximum rate rules table for screening Diameter messages within a DSR having a distributed message processor architecture according to an embodiment of the subject matter described herein. Referring to FIG. 10, table 1000 may specify one or more message level maximum receipt rate rules. That is, table 1000 may include one or more Diameter message screening rules that specify a maximum receipt rate for associated Diameter messages and/or one or more screening functions that should be performed on associated Diameter messages when the current receipt rate exceeds the specified maximum receipt rate. For example, table 1000 includes an entry specifying that Diameter messages having an origin host "MME_Visited"; an origin realm "Visited.net"; any destination host; a destination realm "Home.net"; an application identifier "16777251"; and a message code "322", have a maximum receipt rate of 100 messages per second and that when the current receipt rate for associated messages exceeds 100 messages per second, associated messages should be routed and the network operator notified. Table 1000 also includes an entry specifying that Diameter messages having an origin host "MME_Visited"; an origin realm "Visited.net"; any destination host; a destination realm "Home.net"; an application identifier "16777267"; and any message code, have a maximum receipt rate of 500 messages per second and that when the current receipt rate for associated messages exceeds 500 messages per second, associated messages should be routed and the network operator notified.

Figure 11:
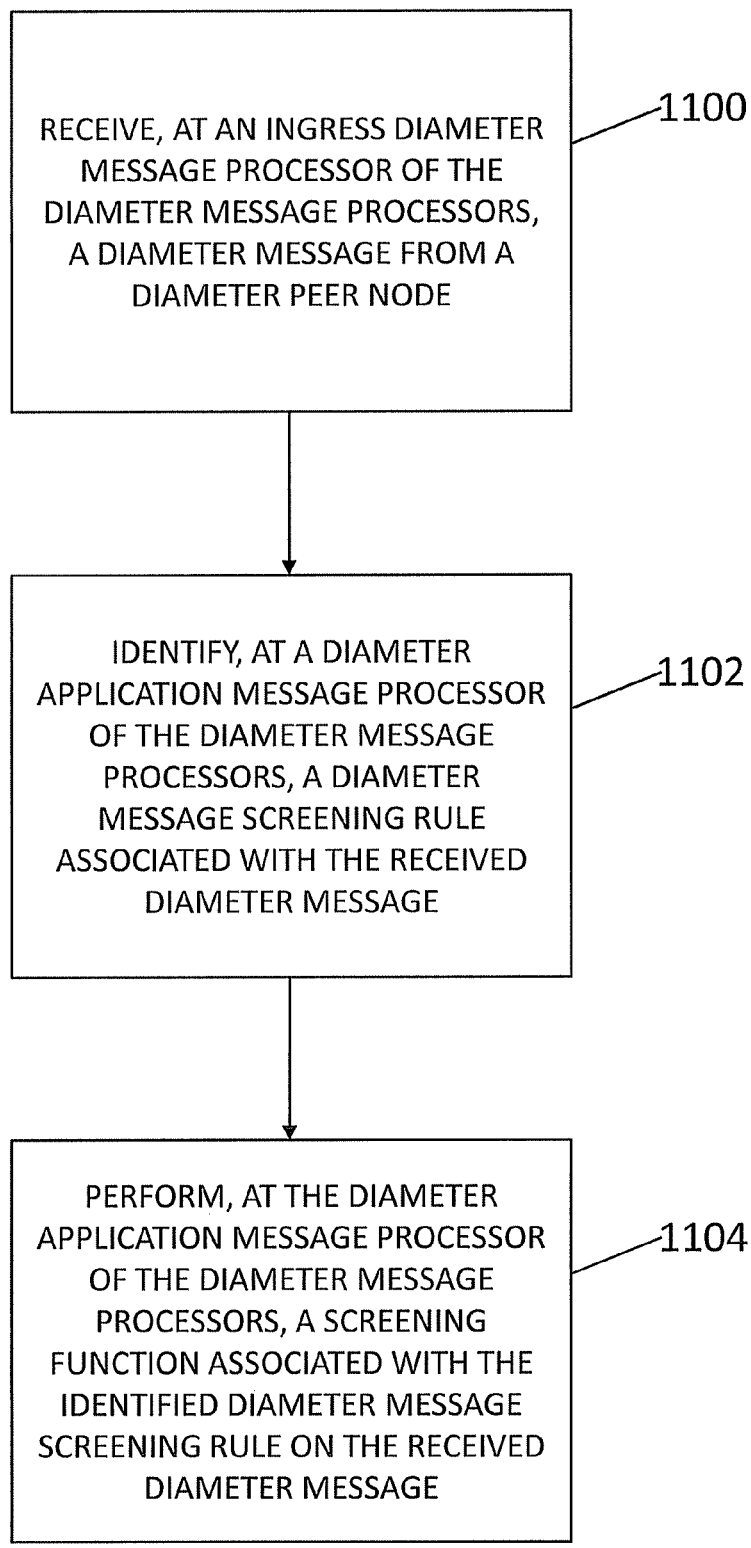
FIG. 11 is a flow chart illustrating an exemplary process for screening Diameter messages within a DSR having a distributed message processor architecture according to an embodiment of the subject matter described herein.

FIG. 11 is a flow chart illustrating an exemplary process for screening Diameter messages within a DSR having a distributed message processor architecture according to an embodiment of the subject matter described herein. The steps occur at a DSR comprising a plurality of Diameter message processors, each configured to perform at least one function. For example, the steps may occur at DSR 108. Referring to FIG. 11, in step 1100, a Diameter message is received, at an ingress Diameter message processor of the Diameter message processors, from a Diameter peer node. For example, DSR node 108's ingress Diameter message processor 204 may receive a ULR message from MME node 106. In step 1102, a Diameter message screening rule associated with the received Diameter message is identified at a Diameter application message processor of the Diameter application message processors. For example, a Diameter message screening rule that specifies that Diameter messages received from MME node 106 should be discarded may be identified at Diameter application message processor 208. In step 1104, a screening function associated with the identified Diameter message screening rule is performed on the received Diameter message at the Diameter application message processor of the Diameter application message processors. For example, the received ULR message may be discarded at Diameter application message processor 208.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for screening Diameter messages within a Diameter signaling router (DSR) having a distributed message processor architecture, the method comprising:
    at a DSR comprising a plurality of Diameter message processors, each configured to perform at least one Diameter function:
        receiving, at an ingress Diameter message processor of the Diameter message processors, a Diameter message from a Diameter peer node;
        identifying, at a Diameter application message processor of the Diameter message processors, a Diameter message screening rule associated with the received Diameter message, wherein the identified Diameter message screening rule specifies a maximum receipt rate for Diameter messages received from the Diameter peer node, wherein the Diameter messages received from the Diameter peer node are associated with a plurality of users;
        performing, at the Diameter application message processor of the Diameter message processors, a screening function associated with the identified Diameter message screening rule on the received Diameter message based on message attribute value pair (AVP) values, wherein performing the screening function on the received Diameter message includes determining that the Diameter message is to be discarded or is to receive additional screening, wherein performing the screening function on the received Diameter message includes adjusting a current receipt rate of Diameter messages associated with the identified Diameter message screening rule to account for the received Diameter message;
        after performing the screening function and determining that the Diameter message is to receive additional screening, performing a second screening function based on the maximum receipt rate for Diameter messages associated with the Diameter message screening rule; and
        in response to the current receipt rate of Diameter messages associated with the identified Diameter message screening rule exceeding the maximum receipt rate, routing the received Diameter message by forwarding the received Diameter message to an egress Diameter message processor of the Diameter message processors and notifying a network operator.

2. The method of claim 1 comprising forwarding the Diameter message from the ingress Diameter message processor to the Diameter application message processor.

3. The method of claim 1 wherein performing the screening function on the received Diameter message includes discarding the received Diameter message.

4. The method of claim 1 wherein performing the screening function on the received Diameter message includes modifying the received Diameter message and forwarding the modified Diameter message.

5. The method of claim 4 wherein modifying the received Diameter message includes at least one of adding new information to the received Diameter message and removing information from the received Diameter message.

6. The method of claim 4 wherein forwarding the modified Diameter message includes forwarding the modified Diameter message to at least one of a Diameter peer node and a home subscriber server (HSS) node.

7. The method of claim 1 wherein performing the screening function on the received Diameter message includes generating a screening event notification message regarding the received Diameter message and communicating the screening event notification message to a network operations center.

8. The method of claim 1 wherein performing the screening function on the received Diameter message includes generating an error message and communicating the generated error message to the Diameter peer node.

9. The method of claim 1 wherein performing the screening function on the received Diameter message includes generating an associated answer message to the received Diameter message and communicating the generated associated answer message to the Diameter peer node.

10. The method of claim 1 wherein performing the screening function on the received Diameter message includes recording or updating one or more usage or measurement statistics associated with the identified Diameter message screening rule to account for the received Diameter message.

11. The method of claim 1 wherein identifying the Diameter message screening rule associated with the received Diameter message includes identifying the Diameter message screening rule associated with the received Diameter message based on at least one of a Diameter connection over which the received Diameter message was received, a Diameter session of which the received Diameter message is a part, an origin host associated with the received Diameter message, an origin realm associated with the received Diameter message, a source Internet protocol (IP) address associated with the received Diameter message, a destination host associated with the received Diameter message, a destination realm associated with the received Diameter message, a Diameter connection over which the received Diameter message will be sent, a destination IP address to which the received Diameter message will be sent, a Diameter application identifier associated with the received Diameter message, a Diameter message command code associated with the received Diameter message, an AVP code associated with the received Diameter message, and an AVP data value associated with the received Diameter message.

12. A system for screening Diameter messages within a Diameter signaling router (DSR) having a distributed message processor architecture, the system comprising:

a DSR comprising:
an ingress Diameter message processor configured to receive a Diameter message from a Diameter peer node; and
a Diameter application message processor configured to identify a Diameter message screening rule associated with the received Diameter message, wherein the identified Diameter message screening rule specifies a maximum receipt rate for Diameter messages received from the Diameter peer node, wherein the Diameter messages are associated with a plurality of users, to perform a screening function associated with the identified Diameter message screening rule on the received Diameter message based on message attribute value pair (AVP) values, wherein performing the screening function on the received Diameter message includes determining that the Diameter message is to be discarded or is to receive additional screening, wherein performing the screening function on the received Diameter message includes adjusting a current receipt rate of Diameter messages associated with the identified Diameter message screening rule to account for the received Diameter message, after performing the screening function and determining that the Diameter message is to receive additional screening, to perform a second screening function based on the maximum receipt rate for Diameter messages associated with the Diameter message screening rule, and in response to the current receipt rate of Diameter messages associated with the identified Diameter message screening rule exceeding the maximum receipt rate, to route the received Diameter message by forwarding the received Diameter message to an egress Diameter message processor of the Diameter message processors and notifying a network operator.

13. The system of claim 12 wherein the ingress Diameter message processor is configured to forward the Diameter message to the Diameter application message processor.

14. The system of claim 12 wherein the Diameter application message processor is configured to perform the screening function on the received Diameter message by discarding the received Diameter message.

15. The system of claim 12 wherein the Diameter application message processor is configured to perform the screening function on the received Diameter message by modifying the received Diameter message and forwarding the modified Diameter message.

16. The system of claim 15 wherein modifying the received Diameter message includes at least one of adding new information to the received Diameter message and removing information from the received Diameter message.

17. The system of claim 15 wherein forwarding the modified Diameter message includes forwarding the modified Diameter message to at least one of a Diameter peer node and a home subscriber server (HSS) node.

18. The system of claim 12 wherein the Diameter application message processor is configured to perform the screening function on the received Diameter message by generating a screening event notification message regarding the received Diameter message and communicating the screening event notification message to a network operations center.

19. The system of claim 12 wherein the Diameter application message processor is configured to perform the screening function on the received Diameter message by generating an error message and communicating the generated error message to the Diameter peer node.

20. The system of claim 12 wherein the Diameter application message processor is configured to perform the screening function on the received Diameter message by generating an associated answer message to the received Diameter message and communicating the generated associated answer message to the Diameter peer node.

21. The system of claim 12 wherein the Diameter application message processor is configured to perform the screening function on the received Diameter message by recording or updating one or more usage or measurement statistics associated with the identified Diameter message screening rule to account for the received Diameter message.

22. The system of claim 12 wherein the Diameter application message processor is configured to identify the Diameter message screening rule associated with the received Diameter message based on at least one of a Diameter connection over which the received Diameter message was received, a Diameter session of which the received Diameter message is a part, an origin host associated with the received Diameter message, an origin realm associated with the received Diameter message, a source Internet protocol (IP) address associated with the received Diameter message, a destination host associated with the received Diameter message, a destination realm associated with the received Diameter message, a Diameter connection over which the received Diameter message will be sent, a destination IP address to which the received Diameter message will be sent, a Diameter application identifier associated with the received Diameter message, a Diameter message command code associated with the received Diameter message, an AVP code associated with the received Diameter message, and an AVP data value associated with the received Diameter message.

23. A non-transitory computer readable medium comprising computer executable instructions that when executed by a processor of a computer control the computer to perform steps comprising:
at a DSR comprising a plurality of Diameter message processors, each configured to perform at least one Diameter function:
receiving, at an ingress Diameter message processor of the Diameter message processors, a Diameter message from a Diameter peer node;
identifying, at a Diameter application message processor of the Diameter message processors, a Diameter message screening rule associated with the received Diameter message, wherein the identified Diameter message screening rule specifies a maximum receipt rate for Diameter messages received from the Diameter peer node, wherein the Diameter messages received from the Diameter peer node are associated with a plurality of users;
performing, at the Diameter application message processor of the Diameter message processors, a screening function associated with the identified Diameter message screening rule on the received Diameter message based on message attribute value pair (AVP) values, wherein performing the screening function on the received Diameter message includes determining that the Diameter message is to be discarded or is to receive additional screening, wherein performing the screening function on the received Diameter message includes adjusting a current receipt rate of Diameter messages associated with the identified Diameter message screening rule to account for the received Diameter message;

after performing the screening function and determining that the Diameter message is to receive additional screening, performing a second screening function based on the maximum receipt rate for Diameter messages associated with the Diameter message screening rule; and in response to the current receipt rate of Diameter messages associated with the identified Diameter message screening rule exceeding the maximum receipt rate, routing the received Diameter message by forwarding the received Diameter message to an egress Diameter message processor of the Diameter message processors and notifying a network operator.

* * * * *